Patented Apr. 6, 1948

2,439,228

UNITED STATES PATENT OFFICE 2,439,228

DIARYL PARAFFINS AND THEIR PRODUCTION

Murray Gray Sturrock, Thomas Lawe, and Woodrow Ernest Kemp, Montreal, Quebec, Canada, assignors to Dominion Tar & Chemical Company, Limited, Montreal, Quebec, Canada No Drawing. Application November 14, 1944, Serial No. 563,454

7 Claims. (Cl. 260—668)

This invention relates to processes of producing diaryl paraffins, to processes of condensing aryl compounds with a saturated aliphatic organic compound consisting of carbon, hydrogen and oxygen atoms having a carbonyl group and having at least two carbon atoms and to new compositions of matter.

Previously a few hydrocarbons such as toluene and xylene have been reacted with acetylene to produce diaryl paraffins. However, the prior art methods of reacting aryl hydrocarbons with acetylene have resulted in low yields and in the production of mixtures of isomers. Furthermore, the proportions of acetylene which may be used without the formation of large proportions of by-products such as anthracene derivatives are extremely low as compared to the theoretrical proportions of acetylene required to react with all of the hydrocarbon. When toluene is reacted with acetylene using the method described in "Organic Syntheses," Coll. vol. I, page 224, it has been found that the product is a mixture of the three possible isomers including about 5–8% of di(o-tolyl) ethane, 15–20% of di(p-tolyl) ethane and the balance is o-tolyl, p-tolyl ethane. Prior to our invention there has been no satisfactory commercial method for preferentially reacting the meta or para xylene contained in the mixtures of meta and para xylene which are ordinarily produced commercially and which can not be readily separated by commercial methods.

An object of the present invention is to provide a new method of producing diaryl paraffins and particularly asymmetric diaryl ethanes.

Another object of the present invention is to provide a process for producing single isomers of the various asymmetric diaryl ethanes.

Still another object of the present invention is to provide a method for the preparation of asymmetric di(m-xylyl) ethane and asymmetric di(p-xylyl) ethane.

A further object of our invention is to separate meta xylene from para xylene.

These and other objects are attained by condensing an aryl compound with a saturated aliphatic organic compound having a carbonyl group and having at least two carbon atoms in the presence of sufficient hydrogen fluoride to catalyze the condensation.

The following examples, in which the proportions are in parts by weight, are given by way of illustration and not in limitation.

Example 1

|  | Parts |
|---|---|
| Paraldehyde | 22 |
| Toluol | 368 |
| Anhydrous hydrogen fluoride | 50 |

A suitable reaction vessel such as a copper kettle, a copper agitator effective to give good mixing of the reactants and means for heating and cooling such as an interior coil or an exterior jacket is charged with 268 parts of the toluol and cooled to 5° C. The hydrogen fluoride is charged and mixed with the toluol. The paraldehyde is mixed with 100 parts of toluol, and preferably cooled to 0–5° C., and it is run into the reactor slowly at such a rate as to keep the reacting mixture between 0–5° C. The time required for the addition of the paraldehyde-toluol mixture is about ½–2 hours or more. Agitation of the reaction mixture is continued for ½-hour at 0–5° C. The reaction mixture is allowed to warm up to 15° C. over a period of ½–1 hour. The reaction is then complete and the contents of the reactor are discharged into 200 parts of ice water, the water containing the hydrogen fluoride separates and is drawn off. The remaining hydrocarbon is then agitated with 200 parts of water after which, upon separation, the water layer is drawn off. The hydrocarbon layer is then washed with 10% aqueous solution of sodium hydroxide by agitation until the hydrocarbon contains no acid. The layer of aqueous solution of sodium hydroxide is drawn off after being permitted to separate from the hydrocarbon. The hydrocarbon is charged to a stripping still and the unreacted toluene contained in the hydrocarbon is distilled yielding about 271 parts. The absolute pressure is reduced to 30 mm. of mercury and at this pressure ditolyl ethane is distilled yielding 100 parts, or a yield based on the toluene consumed and lost of 91% and 95.5% based on paraldehyde. The product distills at atmospheric pressure at 298.0–299.2° C. uncorrected.

Example 2

In the foregoing example the paraldehyde used is only about 25% of that theoretrically required to react with all of the toluene to produce asymmetric ditolyl ethane, whereas in this example 60% of the amount of paraldehyde to react with the toluene is used.

|  | Parts |
|---|---|
| Toluene | 3680 |
| Paraldehyde | 528 |
| Anhydrous hydrogen fluoride | 1320 |

The reaction of these substances is carried out in the same manner as in Example 1, the paraldehyde being dissolved in 1000 parts of the toluene before being charged to the reactor containing 2680 parts of the toluene and the hydrogen fluoride. The crude product is washed and distilled as described in Example 1. 1490 parts of toluene are recovered and 2270 parts of asymmetric ditolyl ethane, boiling at 298.5–301° C. at atmospheric pressure uncorrected, are obtained. This is 91% of the theoretical yield based on the toluene consumed and lost and 90.2% of the theoretical yield based on paraldehyde.

Example 3

In this example 50% of the theoretical amount of paraldehyde required for reaction with all of the m-xylene present is used.

| | Parts |
|---|---|
| Xylene (75.5% m-xylene; 24.5% p-xylene) | 424 |
| Paraldehyde | 33.2 |
| Anhydrous hydrogen fluoride | 46.5 |

324 parts of the xylene are charged into a reactor such as a stainless steel kettle constructed as described in Example 1. The xylene is cooled to about 7° C., the hydrogen fluoride is charged and then the paraldehyde, dissolved in 100 parts of the xylene, is charged with agitation. The temperature is maintained at 0–7° C. by adding the xylene-paraldehyde mixture slowly, e. g. over a period of 30 minutes or more. After the xylene-paraldehyde mixture is added, the temperature of the reaction mixture is raised slowly over a period of about 1½ hours to about 65° C. during which time the reaction mixture is agitated continuously. The reaction mixture is discharged into ice water, washed, and processed as described in Example 1.

After washing, the reaction mixture is distilled in a stripping still at atmospheric pressure to separate 266 parts of xylene and then the absolute pressure is reduced to 30 mm. of mercury and the asymmetric di-(m-xylyl) ethane is distilled to yield about 157 parts. This corresponds with 88.8% of the theoretical yield based upon the xylene consumed and lost and 87.3% of the theoretical yield based on paraldehyde.

The amount of xylene reacted is 424 parts minus the 266 parts which is 158 parts. Assuming that only m-xylene reacts, the m-xylene in the recovered xylene is 320 parts (75.5% of 424) minus the m-xylene reacted, i. e. 158 parts, and this equals 162 parts. Theoretically, then, the recovered xylene should contain $$\frac{162}{266} \times 100 = 61.0\% \text{ m-xylene}$$

An analysis of the recovered xylene by freezing point shows that it contains 61.1% of m-xylene. Since the difference in the theoretical and analytical values for the proportions of m-xylene in the recovered xylene are equal within the experimental error, it is apparent that no p-xylene reacts.

The xylene recovered from one or more reactions as described above is further utilized as follows:

| | Parts |
|---|---|
| Xylene (61.1% m-xylene, 38.9% p-xylene) | 475 |
| Paraldehyde | 30.1 |
| Anhydrous hydrogen fluoride | 42.2 |

The paraldehyde is dissolved in 100 parts of the xylene and charged into a reactor of the type described above, containing 375 parts of the xylene which has been cooled to 7° C. and to which the hydrogen fluoride has been added. The reaction is carried out in the same manner as described above. After washing the crude product, it is distilled at atmospheric pressure to recover 333 parts of xylene and then the absolute pressure is reduced to 30 mm. of mercury and 142 parts of asymmetric di-(m-xylyl) ethane are distilled. This corresponds with 89.3% of the theoretical yield based upon the xylene consumed and lost and 87.3% of the theoretical yield based upon the paraldehyde. The calculated theoretical proportion of m-xylene in the recovered xylene is 44.5% whereas the recovered xylene is found to contain 45.0% of m-xylene by freezing point analysis, thus showing that again no p-xylene has reacted.

The recovered xylene of one or more operations such as that just described is reprocessed in the following manner:

When 500 parts of xylene (44.5% m-xylene and 55.5% p-xylene), 32.4 parts of anhydrous hydrogen fluoride and 23.1 parts of paraldehyde are reacted, the condensate washed, and distilled as described above, 397 parts of xylene are recovered upon atmospheric distillation of the crude product and at 30 mm. of mercury absolute pressure 102 parts of asymmetric di-(m-xylyl) ethane are recovered. This represents a yield of 88.9% based on the xylene consumed and lost and 81.8% based on the paraldehyde. In this case an extremely small proportion of the p-xylene reacts as shown by the freezing point analysis of the recovered xylene as compared to the theoretical calculated analysis. However, if the reaction is carried out entirely at about 0° C., instead of raising the temperature of the reaction mixture to 65° C. before discharging into ice water, the reaction of the p-xylene is substantially eliminated. Another factor influencing the reaction of the p-xylene is the concentration in water of the hydrogen fluoride and, if the concentration of hydrogen fluoride in water is kept below 90%, the reaction of the para compound is substantially avoided even at temperatures above about 0° C. An example of the reaction at low temperatures of xylene mixtures containing about 50% or less of m-xylene whereby the reaction of p-xylene is substantially avoided follows.

Example 4

| | Parts |
|---|---|
| Xylene (50% m-xylene, 50% p-xylene) | 450 |
| Paraldehyde | 23.4 |
| Anhydrous hydrogen fluoride | 39.8 |

350 parts of xylene are charged into a nickel kettle constructed in the manner described in Example 1 and cooled to −3° C. after which the hydrogen fluoride is added. The paraldehyde dissolved in 100 parts of xylene is added slowly with good agitation at such a rate as to maintain the temperature at −7° C. to −3° C. and this requires about 70 minutes or more. After all of the paraldehyde is added, the temperature of the reaction mixture is maintained at about −3° C. for one hour during which time the reaction mixture is agitated. The reaction mixture is then discharged into ice water and washed as described in Example 1. The crude product is distilled at atmospheric pressure and 345 parts of xylene are recovered while 106 parts of asymmetric di(m-xylyl) ethane are obtained upon distillation at 30 mm. of mercury absolute pressure. This corresponds to a yield of 90.0% based on xylene consumed and lost and 84.3% based on the paraldehyde. The theoretical calculated concentration of the m-xylene in the recovered xylene is 34.8% m-xylene and by freezing point analysis the content is found to be 35.0% thus showing that no p-xylene reacts under the conditions used.

The freezing point of the xylene recovered is about −4° C. and upon cooling to −35.5° C. with agitation, the pure p-xylene separated as a fine crystalline mass which may be centrifuged to yield pure p-xylene (freezing point +13.3° C.).

The mother liquor contains 75.5% m-xylene and 24.5% p-xylene and this approximates the original xylene used in the beginning of Example 3 and hence may be recycled through our process.

The asymmetric di(m-xylyl) ethane obtained from the above described process distills at atmospheric pressure between 323–325° C., uncorrected, and it has a freezing point of 38.6° C., uncorrected.

The p-xylene separated from the m-xylene is pure p-xylene and therefore it may be used for various purposes including the condensation with an acetaldehyde as illustrated in the following example.

Example 5

| | Parts |
|---|---|
| p-Xylene (freezing point +13.3° C.) | 120 |
| Paraldehyde | 8.7 |
| Anhydrous hydrogen fluoride | 40 |

100 parts of the xylene are charged into a reactor of the type employed in Example 1 and cooled to 18° C. The hydrogen fluoride is charged and then the paraldehyde, dissolved in 20 parts of the xylene, is added to the reactor slowly with good agitation and at such a rate as to maintain the temperature at 18° C. to 26° C. The temperature must be kept as low as about 18° C. in order to avoid loss of the hydrogen fluoride if the reaction be carried out at atmospheric pressure. To increase the rate of reaction it is desirable that the temperature be raised to 26° C. as soon as the hydrofluoric acid is sufficiently dilute as not to be too volatile or the temperature may be raised initially if the reaction be carried out under pressure sufficiently above atmospheric pressure to avoid undue loss of the hydrogen fluoride. The time required for the addition of the paraldehyde-xylene mixture is about 30 minutes or more. Agitation is continued after the addition of the paraldehyde for about 1 hour while maintaining the temperature at 26°–28° C. The reaction mixture is discharged into water at about 15° C., washed and processed as described in Example 1. The crude product is distilled in a stripping still at atmospheric pressure to recover 78.0 parts of p-xylene and then at 30 mm. mercury absolute pressure to obtain 38 parts of 2,5,2',5'-tetramethyl α,α diphenyl ethane having a M. P. of 64.0° C. and a boiling range at atmospheric pressure of 312°–314° C., uncorrected. This represents a yield of 80.6% based on the p-xylene consumed and lost and a yield of 80.5% based on paraldehyde.

Example 6

In this example 50% of the amount of paraldehyde theoretically required for reaction with the o-xylene is employed.

| | Parts |
|---|---|
| o-Xylene (freezing point −25° C.) | 424 |
| Paraldehyde | 44.0 |
| Anhydrous hydrogen fluoride | 96.8 |

324 parts of the xylene are charged to a suitable reactor of the type described in Example 1 and cooled to +2° C. to +5° C. and to this the hydrofluoric acid is added. The paraldehyde is dissolved in 100 parts of the xylene and is added somewhat more slowly than in the previous example so as to maintain the temperature at about 2–5° C. requiring about 1 hour or more. The temperature is raised to 7° C. and the reaction mixture agitated for 1 hour. The reaction mixture is discharged into ice water, washed and processed as described in Example 1. The washed, crude product is distilled in a stripping still, first at atmospheric pressure to recover 214 parts of o-xylene, and then at 30 mm. of mercury absolute pressure to obtain 233 parts of asymmetric di(o-xylyl) ethane. This corresponds to a yield of 98.7% based upon the xylene consumed and lost and 98.0% based on paraldehyde.

The asymmetric di(o-xylyl) ethane obtained from the above process distills at atmospheric pressure between about 331.5° C. and about 333.0° C., uncorrected.

Example 7

In this example, 50% of the theoretical amount of paraldehyde to react with all of the naphthalene is employed. The chlorbenzene which is used as a solvent for the naphthalene does not react because of the far greater reactivity of the naphthalene.

Solution:

| | Parts |
|---|---|
| Naphthalene | 200 |
| Chlorbenzene | 600 |
| Paraldehyde | 10.1 |
| Anhydrous hydrogen fluoride | 90 |

500 parts of the solution of the naphthalene and chlorbenzene are charged into the same type of reactor as described in Example 1 and cooled to about 18° C. The hydrogen fluoride is added with agitation and this is followed by the addition of the paraldehyde dissolved in 100 parts of the solution of the naphthalene and chlorbenzene. The latter solution is added at such a rate that the temperature remains at about 20° C. and this requires about 45 minutes or more. The reaction mixture is heated to 35° C. and maintained at that point for about 1 hour during which time the reaction mixture is continuously agitated. The reaction mixture is discharged into ice water and washed according to the procedure of Example 1. The crude product is distilled at 30 mm. of mercury absolute pressure to remove the chlorbenzene then to recover 123 parts of naphthalene and then to obtain 54 parts of a pale yellow viscous oil which crystallizes upon standing as asymmetric dinaphthyl ethane and after recrystallization from petroleum ether it has a melting point of 95–96° C. This corresponds to a yield of 66.3% based upon the naphthalene consumed and lost and 51.5% based on paraldehyde.

Example 8

| | Parts |
|---|---|
| Diphenyl | 200 |
| Chloroform | 600 |
| Paraldehyde | 30 |
| Anhydrous hydrogen fluoride | 150 |

The diphenyl is dissolved in the chloroform and 500 parts of the solution are charged into a reactor of the type described above and then cooled to 10° C. after which the hydrogen fluoride is added causing a slight drop in the temperature. The temperature is raised to about 20° C. and the paraldehyde mixed with 100 parts of the diphenyl-chloroform solution is added slowly to the reactor with agitation. After this, the temperature is raised to 30° C. and maintained at this point for about 2 hours during which time the reaction mixture is continuously agitated. The crude product is discharged and washed as described in Example 1. The product is distilled at atmospheric pressure to remove the chloroform, then 165 parts of unreacted diphenyl and finally 25 parts of asymmetric dixenyl ethane. This represents a yield of 65.8% based on the diphenyl lost and consumed.

It is desirable to employ higher reaction temperatures in producing asymmetric dixenyl ethane such as 40–65° C. and in this case it would be necessary to employ superatmospheric pressures in order to avoid the loss of hydrogen fluoride. Furthermore, it would be preferable to employ higher weight ratios of hydrogen fluoride to paraldehyde such as from 10:1 to 50:1.

Other aryl compounds may be reacted with saturated aldehydes and ketones as illustrated in the examples. However, in some cases the reactivities of aryl hydrocarbons are considerably different from those of the compounds which are reacted with paraldehyde in accordance with the foregoing examples. The most reactive aryl compounds are those having nuclear methyl substituents. Benzene itself is much less active than toluene or any of the xylene isomers. Naphthalene and diphenyl may be reacted in the manner illustrated in Examples 7 and 8, but it is to be noted that the reactivity of these compounds is considerably less than the reactivity of toluene and the xylenes. Nuclear chlor substituted aryl compounds may be condensed with an acetaldehyde or the like in accordance with our invention but the reactivity of these compounds is extremely low by comparison with the activity of the nuclear methyl substituted aryl compounds. Accordingly, a nuclear chlor aryl compound, such as chlorbenzene, may be used as a solvent for aryl compounds which are normally solid such as naphthalene since the difference in reactivity causes the reaction to selectively react the hydrocarbons leaving the chlorinated compound substantially unreacted. Any of the aromatic hydrocarbons which are condensed with a ketone or an aldehyde in accordance with this invention may be substituted by bromine or fluorine, as well as chlorine. Furthermore, such substituted compounds may contain 1, 2, or 3 or more substituents, including the halogens mentioned and also including alkyl groups such as methyl groups. Examples of such compounds are each of the mono and dichlortoluenes. The chlor xylenes may also be used, as well as the ethyl xylenes.

If desired, inert solvents may be employed in our process of condensing aldehydes or ketones with an aryl compound. Examples of these are the chlorinated solvents such as chloroform, carbon tetrachloride, etc. When a normally solid aryl compound, such as naphthalene or diphenyl, is to be reacted with a ketone or aldehyde, an inert or relatively inactive material is employed as a solvent in order to have the aryl compound in liquid form.

In reacting the aryl compounds which have a low reactivity it is desirable that the ratio of hydrogen fluoride to the aldehyde or ketone be relatively high. Thus for the reaction of diphenyl and the nuclear chlor aryl compounds, weight ratios of hydrogen fluoride to the aldehyde or ketone may be as high as 50:1. In order to avoid the decomposition of the product produced according to our process it is desirable that the proportion of hydrogen fluoride be kept as low as possible and yet sufficiently high to obtain complete reaction of the aldehyde or ketone. It is important that all of the aldehyde or ketone be reacted in order to obtain high yields and in order to avoid difficulties which are otherwise encountered during the purification of the diaryl paraffin produced. The proportion of hydrogen fluoride employed should be kept high in order to obtain high yields based upon the aldehyde or ketone added, but it should be kept sufficiently low to avoid needless excess.

Aliphatic saturated organic compounds consisting of carbon, hydrogen and oxygen atoms having a carbonyl group and having at least two carbon atoms are suitable for use in accordance with our invention. Among these, the aldehydes having at least two carbon atoms and the ketones having relatively short chain alkyl groups and preferably straight chain alkyl groups are especially suitable. Some examples of these include acetone, acetaldehyde, propionaldehyde, butyraldehyde, n-valeraldehyde, trimethyl acetaldehyde, heptaldehyde, methyl ethyl ketone, methyl hexyl ketone, etc. As indicated by the examples given, the aldehydes and ketones having no more than eight carbon atoms are preferred. Fluid acetaldehydes including acetaldehyde itself and paraldehyde may be used, but paraldehyde is preferred because of its relatively high boiling point by comparison with acetaldehyde which enables one to carry out the reaction easily at atmospheric pressure without the loss of acetaldehyde. Acetaldehyde itself may be used without difficulty if the temperature be sufficiently low and/or if the pressure is sufficiently high to avoid undue loss of the acetaldehyde.

We prefer to employ about 50% or less of the theoretical proportion of aldehyde required for reaction with an aryl compound to produce diaryl paraffin. In order to obtain a high yield of diaryl paraffin the proportion of aldehyde to the aryl compound should not be more than about 60% of that theoretically required for reaction of the aldehyde to form the diaryl compound. If higher proportions of the aldehyde to the aryl compound be employed, lower yields of the diaryl compound will result with the formation of anthracene derivatives and the like.

The ratio of aldehyde to aryl compound is particularly important when an aldehyde is to be reacted preferentially with a single aryl compound in a mixture of aryl compounds. For example, in the reaction of mixtures of meta and para xylene containing a major proportion of meta xylene the proportion of aldehyde employed may be as much as 60% of that theoretically required to react with the meta xylene in the mixture to form the asymmetric di(m-xylyl) paraffin. However, it is preferable that the proportion of aldehyde should not be greater than about 50% of that required to react with all of the meta xylene in those meta-para xylene mixtures containing minor proportions of meta xylene. This is illustrated in Examples 3 and 4.

The reaction of an acetaldehyde with an aryl compound to produce a diaryl ethane in accordance with our invention may be carried out at temperatures ranging from about −20° C. up to 65° C. or higher. Generally we find that the reaction is preferably carried out in the neighborhood of 0° C. until after the initial condensation of the aldehyde and aryl compound has taken place. The temperature may then be raised gradually to 65° C. as illustrated in Examples 1–3. However, when polynuclear aryl compounds are reacted with an acetaldehyde, the reaction may be carried out at elevated temperatures even in the presence of concentrated or anhydrous hydrogen fluoride inasmuch as the products from it do not tend to decompose readily. If the concentration of hydrogen fluoride (in water) is very high, high temperatures tend to cause decomposition of the diaryl paraffin and hence should be avoided. High temperatures may be employed however when the hydrogen fluoride concentration (in water) is not sufficiently high to decompose the products. Another factor influencing the use of high temperatures is the volatility of the hydrogen fluoride. If the reaction is started with anhydrous hydrogen fluoride, the reaction mixture must be sufficiently cool to prevent loss of the hydrogen fluoride or else the reaction must be carried out under superatmospheric pressures which are sufficiently high to avoid the vaporization of the hydrogen fluoride. The temperature selected for the reaction is also affected by the freezing point of the aryl hydrocarbon being reacted. Unless the aryl hydrocarbon is dissolved in a solvent which will result in a solution which is liquid at low temperatures, the reaction must be conducted at a temperature sufficiently high so that the aryl compound be maintained in liquid form. The proportion of hydrogen fluoride employed may be varied over a relatively wide range. However, sufficient hydrogen fluoride to absorb all of the water resulting from the condensation of the aldehyde or ketone with the aryl compound must be employed. On the other hand, the concentration of hydrogen fluoride (in water) must be sufficiently high so that the reaction or condensation of the aryl compound with the aldehyde or ketone will be catalyzed by the hydrogen fluoride. For most of the condensations with the aryl compounds which have a high degree of reactivity with acetaldehyde, we find that the weight ratio of anhydrous hydrogen fluoride to the acetaldehyde should be between about 1.4:1 and 5:1.

By our process we are able to produce pure asymmetric diaryl ethanes such as asymmetric di(p-tolyl ethane), 2,5,2',5' tetramethyl asymmetric diphenyl ethane (from para xylene) and pure single isomers of asymmetric di(o-xylyl) ethane and of asymmetric di(m-xylyl) ethane. The asymmetric diaryl ethanes obtained from m-xylene and p-xylene are crystalline products previously unknown and unobtainable by any of the syntheses known to the prior art. The production of pure compounds is especially important in the production of styrenes which are to be used for polymerizing reactions and the like, where mixtures of products may be undesirable. The production of pure vinyl aryl compounds from asymmetric diaryl paraffins, such as those produced in accordance with our inventions, is described and claimed in the copending applications of Murray G. Sturrock and Thomas Lawe, Serial No. 331,382, filed April 24, 1940, now U. S. Patent 2,373,982, issued April 17, 1945, and Serial No. 557,936, filed October 7, 1944, now U. S. Patent 2,420,688, issued May 20, 1947. The production of pure dimethyl styrenes from the pure dixylyl ethane produced in accordance with the present invention is described in application Serial No. 563,452, filed November 14, 1944, now U. S. Patent 2,420,689, issued May 20, 1947, entitled "Nuclear substituted dimethyl styrenes and their production." In this latter application it has been shown that pure dimethyl styrenes are obtained from the pure dixylyl ethanes produced in accordance with the present invention. Accordingly, this shows the high degree of purity of the dixylyl ethanes prepared in accordance with our process.

Many of the diaryl paraffins produced in accordance with our invention are useful as insecticides, as electrical insulating media in electrical condensers and the like, or as starting materials in the production of insecticides.

We claim:
1. A monoisomeric composition including an asymmetric dixylyl ethane.
2. Crystalline asymmetric di(m-xylyl) ethane.
3. Crystalline 2,5,2',5' tetramethyl asymmetric diphenyl ethane.
4. A process which comprises condensing a hydrocarbon of the benzene series containing at least one hydrocarbon substituent and having at least one hydrogen attached to the benzene nucleus with a saturated aliphatic aldehyde having at least 2 carbon atoms in the presence of hydrogen fluoride, the weight ratio of hydrogen fluoride to the aldehyde being between about 1.4:1 and 5:1.
5. A process which comprises condensing m-xylene from a mixture of m-xylene and p-xylene with a substance selected from the group consisting of acetaldehyde and paraldehyde in the presence of sufficient hydrogen fluoride to catalyze the reaction, the proportion of said substance being less than about 60% of that theoretically required to react with all of the m-xylene, whereby the m-xylene reacts preferentially.
6. A process which comprises condensing m-xylene from a mixture of m-xylene and p-xylene with a substance selected from the group consisting of paraldehyde and acetaldehyde in the presence of sufficient hydrogen fluoride to catalyze the condensation, the proportion of said substance being less than about 60% of that theoretically required to react with all of the m-xylene, whereby the m-xylene reacts preferentially, washing the resulting product to remove the hydrogen fluoride, distilling said product to remove the dixylyl ethane produced, recovering the unreacted xylene, condensing the m-xylene from said unreacted xylene, which is a mixture of m-xylene and p-xylene having a lower concentration of m-xylene than in the first mentioned mixture, with a substance selected from the group consisting of paraldehyde and acetaldehyde in the presence of sufficient hydrogen fluoride to catalyze the condensation, the proportion of said substance being less than 60% of the theoretical proportion required to react with all of the m-xylene in said unreacted xylene, whereby the m-xylene reacts preferentially, washing the resulting product to remove the hydrogen fluoride and distilling said product to remove the dixylyl ethane produced.
7. A processs which comprises condensing m-xylene from a mixture of m-xylene and p-xylene, containing about 75% of the former, with a substance selected from the group consisting of paraldehyde and acetaldehyde in the presence of sufficient hydrogen fluoride to catalyze the condensation, the proportion of said substance being not more than about 60% of that theoretically required to react with all of the m-xylene, whereby the m-xylene reacts preferentially, washing the resulting product to remove the hydrogen fluoride, distilling said product to remove the dixylyl ethane produced, recovering the unreacted xylene, condensing m-xylene from said unreacted xylene which is a mixture of m-xylene and p-xylene containing less than about 75% of m-xylene, with one of said substances and in the presence of sufficient hydrogen fluoride to catalyze the condensation, the proportion of said substance being not more than 60% of that theoretically required to react with all of the m-xylene in said unreacted xylene, washing the resulting product to remove the hydrogen fluoride and distilling the product to recover the dixylyl ethane produced, recovering the xylene residue, condensing the m-xylene from said xylene residue, which is a mixture of m-xylene and p-xylene and which contains less m-xylene than the aforementioned unreacted xylene, with one of said substances in the presence of sufficient hydrogen fluoride to catalyze the condensation, the proportion of said substance being less than 60% of that theoretically required to react with all of the m-xylene in said xylene residue, whereby the m-xylene reacts preferentially, washing the resulting product to remove the hydrogen fluoride, and distilling said product to remove the dixylyl ethane produced.

MURRAY GRAY STURROCK.
THOMAS LAWE.
WOODROW ERNEST KEMP.

REFERENCES CITED

The following references are of record in the file of this patent:

UNITED STATES PATENTS

| Number | Name | Date |
| --- | --- | --- |
| 2,275,312 | Tinker et al. | Mar. 3, 1942 |
| 2,324,784 | Lieber | July 20, 1943 |
| 2,349,211 | Tulleners | May 16, 1944 |

OTHER REFERENCES

Thomas, "Anhydrous Aluminum Chloride in Organic Chemistry," pages 642 and 643 (1941). (Copy in Division 31.)

Reichert et al., "The Catalytic Condensation—Homologs," Jour. Amer. Chem. Soc., vol. 45, pages 3090–3091 (Dec. 1923), (2 pages). (Patent Office Library.)

Simons, "Potential Use of Hydrogen Fluoride in Organic Chemical Processes," Ind. & Eng. Chem., vol. 32, No. 2 (Feb. 1940), pages 178–183 (6 pages). (Patent Office Library.)